United States Patent [19]

Karcher et al.

[11] 4,094,567
[45] June 13, 1978

[54] COMBINATION QUICK CONNECT-DISCONNECT PNEUMATIC/ELECTRICAL COUPLING

[75] Inventors: Thomas D. Karcher, Rocky River; Harry H. Hammond, North Royalton, both of Ohio

[73] Assignee: The Hansen Manufacturing Company, Cleveland, Ohio

[21] Appl. No.: 756,759

[22] Filed: Jan. 5, 1977

[51] Int. Cl.$^2$ .............................................. H01R 3/04
[52] U.S. Cl. .................. 339/15; 137/625.25; 339/35; 339/42
[58] Field of Search ............... 339/15, 16 R, 35, 42; 137/625.25

[56] References Cited
U.S. PATENT DOCUMENTS 3,085,219  4/1963  Bass, Jr. ............................ 339/15
3,110,537  11/1963  Poetzsch et al. ............... 339/16 R
3,845,450  10/1974  Cole et al. ......................... 339/42

Primary Examiner—Roy Lake
Assistant Examiner—DeWalden W. Jones

[57] ABSTRACT

There is provided a quick connect-disconnect coupling for simultaneous connection and disconnection of fluid conduits and an electrical conductor. The coupling is characterized by an electrical socket structure carried by a wall across the fluid socket. The electrical socket is constructed and dimensioned for telescopic receipt of a fluid plug member adapted to be lockingly engaged in said fluid socket. The fluid plug member includes a cooperating electrical plug structure recessed within the leading end portion thereof. The fluid plug and the fluid socket members protect the electrical conductor elements in the disconnected condition against damage in handling. A sleeve valve is provided in the coupling to control fluid flow between on and off conditions while the coupling is connected.

13 Claims, 4 Drawing Figures

COMBINATION QUICK CONNECT-DISCONNECT PNEUMATIC/ELECTRICAL COUPLING

BACKGROUND OF THE INVENTION AND PRIOR ART

The present invention relates to an improved quick connect-disconnect coupling for simultaneous connection and disconnection of fluid conduits and electrical conductors.

There are numerous industrial applications wherein the utilization of pressurized gas and electrical energy simultaneously is encountered, for example, assembly work. In another application transmission of both sources of power through a liquid medium to submerged equipment is facilitated by the provision of both forms of power in the same conduit.

In industrial usage, for example, the exchange of one fluid conduit for another, as in the employment of tools performing different operations, must often be rapidly with consequent rough handling of the disconnected portions. Such handling frequently results in damage to projecting electrical connector elements and eventual misfitting of the parts and failure to establish adequate electrical connection.

Still further, difficulty is often encountered in failure to provide for adequate resistance to side thrust forces transaxially applied at such a coupling which also results in weakening of the electrical connector components to the point where early failure is experienced.

U.S. Pat. No. 3,649,949 discloses a quick connect-disconnect coupling where the electrical connector elements are protected by the leading end portion of the plug member in the connected condition. Nevertheless, the electrical connector elements and locating pin of this prior art device are exposed to damage occasioned by rough handling in the disconnected condition. U.S. Pat. Nos. 3,649,948 and 3,271,725 show other types of pneumatic/electrical couplers which are not of the quick connect-disconnect type.

The present invention utilizes a fluid coupling similar to that shown in U.S. Pat. No. 3,404,705 wherein a wall or partition extends across a socket member and a manually movable valve sleeve member controls flow of fluid, such as pressurized gas, past the wall member.

BRIEF STATEMENT OF THE INVENTION

The present invention is an improvement on prior art structures and provides means for protecting the electrical connector element in either of the connected or disconnected conditions. The present invention also provides for improved support of the coupled portions of both the fluid conduits and the electrical socket and plug members.

The devices of the present invention are characterized in that a recessed wall across a socket portion supports a first electrical conductor element, preferably disposed in a cup and defining an annular space between the cup and the electrical socket member including embedded therein an electrical connector element. This assembly coacts in the connected condition with a leading end portion of a fluid plug member which has a leading end portion with an electrical plug element recessed therein. The electrical plug element is circumvallated by the leading end portion of the plug and is telescopically received by the first electrical socket member. Electrical connector elements project from the electrical plug member carried in the fluid plug member and are received for electrical connection within the socket member. The entire connection is circumvallated by the leading end portion of the fluid plug member in the connected condition. The plug is retained in the connected condition by suitable locking elements coacting through the plug-receiving end of the socket with a suitable circumferential recess or groove in the wall of fluid plug and controlled by locking means including an axially slidable sleeve member and radially movable locking elements. Valving of the fluid flow is selectively manually controlled by an axially slidable valve member for directing fluid past the wall.

Thus, the electrical contact elements are continuously protected from damage due to rough handling in the disconnected condition and the structure provides for stability of the coupling element against side thrust force in the connected condition.

BRIEF DESCRIPTION OF THE DRAWINGS

The invention will be better understood by having reference to the annexed drawings wherein.

DETAILED DESCRIPTION OF THE DRAWINGS

Figure 1:
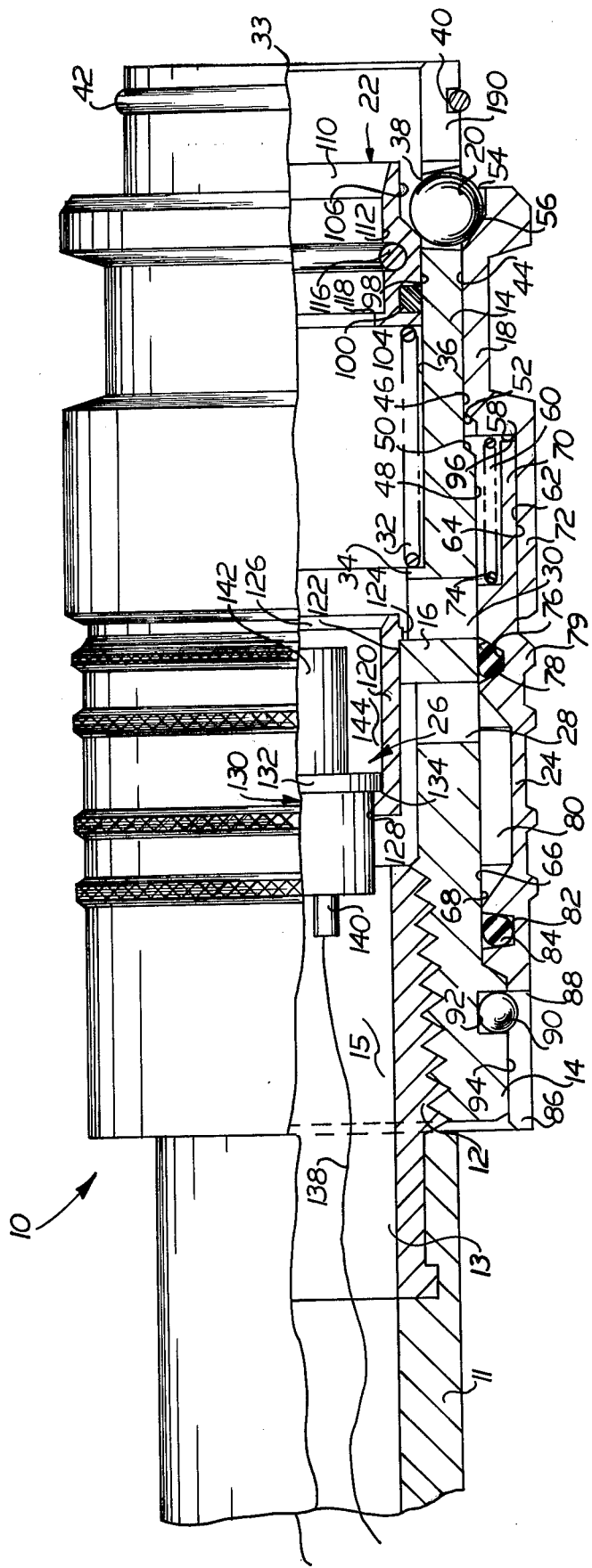
FIG. 1 is a side elevation of a fluid socket of the present invention partially cut away and cross-sectioned, and showing such fluid socket structure in the uncoupled or disconnected condition.
Figure 2:
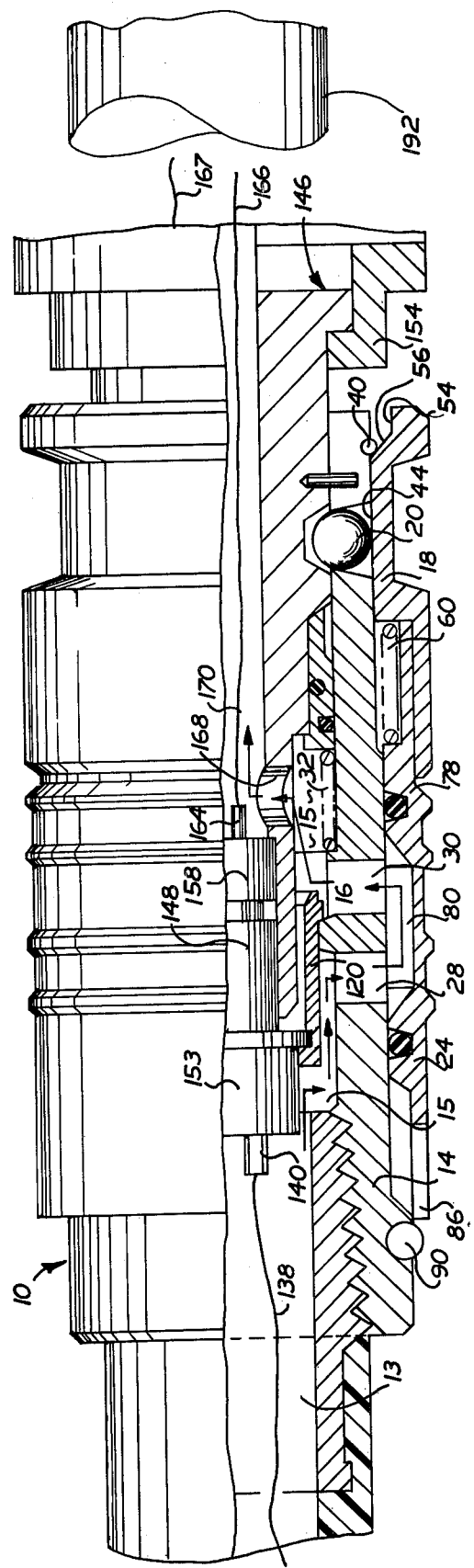
FIG. 2 is a side elevational view of the structure of FIG. 1, partially in cross section and showing a coupling of the present invention in the coupled or connected condition with a fluid plug member.

The socket assembly 10 shown in FIG. 1 includes an externally threaded tubular member 12 attached to a fluid conduit 11 and threadedly engaged in an internally threaded member 14. The socket member 14 is provided with a transversely extending wall 16 which blocks axial fluid flow at the location thereof in the socket 10. Concentrically disposed around the outside of the socket 14 there is provided a cylindrical locking sleeve 18 which cooperates with radially movable locking members, e.g. balls 20, for locking engagement with a plug 146 as shown in FIG. 2. To retain the locking members 20 when the coupling is in the disconnected condition, there is provided a longitudinally slidable ball retainer 22. For controlling the valving of the pressurized gas which will pass from left to right through the socket as shown by arrows in FIG. 2, there is provided a valve sleeve 24 which is manually axially movable substantially independently of the axially slidable locking sleeve 18. An electrical socket assembly 26 is supported by the wall 16 and recessed within and circumvallated by the walls of the socket 10. These parts constitute the principal elements of the structure shown in FIG. 1.

The externally threaded socket member 12 is adapted by any suitable means to be secured to a fluid conduit 11 in which flows or is contained a gas, liquid or gas/liquid combination, for example, compressed air with suspended particles of oil. The fitting 12 has an upstream mouth or opening 13 which is received into a correspondingly internally threaded socket member 14 of generally tubular configuration. As indicated, there is provided across the internal diameter of the fluid socket member 14 a wall 16 in which the electrical socket means 26 is installed as shown in FIG. 1 and blocks the flow of pressurized fluid axially through the socket 10.

In order to provide a path for pressurized fluid to follow, a portion between the extremities of the internally threaded socket member 14 is provide with a pair of arrays of circumferentially disposed ports 28 and 30, one such array disposed on each side of the wall 16. The ports 28 and 30 are of sufficient size and number to permit adequate flow of pressurized fluid past the wall 16 as indicated below.

In a specific embodiment, each of the circumferential arrays of ports 28 and 30 is composed of radial bores, e.g. nine circular holes at 40° intervals about the circumference of the internally threaded socket member 14. It is convenient for structural reasons to rotationally displace the circular array of ports 30 relative to the circular array of ports so that the ports 28 and 30 are in staggered relation in a circumferential direction.

In order to provide seating means for a ball retainer coil spring 32 hereinafter described, the internally threaded socket member 14 is conveniently provided with a radially inwardly projecting shoulder 34. The internally threaded socket portion 14 is provided over a suitable axial extent with a cylindrical bore 36 along at least a portion of which a ball retainer member 22 is axially movable against the bias of the spring 32 seated on the shoulder 34 as hereinafter more particularly described. At a convenient axial point inwardly adjacent the open leading end portion 33 of the socket 10, there is provided a plurality of circumferentially disposed radially extending holes 38 for retention of radially movable locking members, e.g. balls 20. The holes 38 are disposed at uniform intervals about the circumference, for example, 120° apart when utilizing three such locking balls 20. The outer extremity 33 at the right end of the socket as shown in FIG. 1 is conveniently provided with a circumferential recess 40 in which there is retained a snap ring retainer 42 which prevents the locking sleeve 18 from escaping the socket 10.

The mode of operation of the locking sleeve 18, the locking balls 20 and the ball retainer 22 is similar to that shown in U.S. Pat. No. 3,404,705. However, the mode of sealing the fluid plug when in the connected condition is quite different.

The locking sleeve 18 is provided with a minor diameter cylindrical surface 44 for sliding engagement with an external minor diameter cylindrical surface 46 of the socket member 14. The socket member 14 is conveniently provided with a stepped outer cylindrical surface 48 to provide a frustoconical abutment 50 against which a corresponding frustoconical surface 52 of the locking sleeve 18 abuts when retracted. This stop 52 prevents excessive retraction of the locking sleeve 18 whereby the locking balls 20 might otherwise become dislodged from the holes 38.

Figure 3:
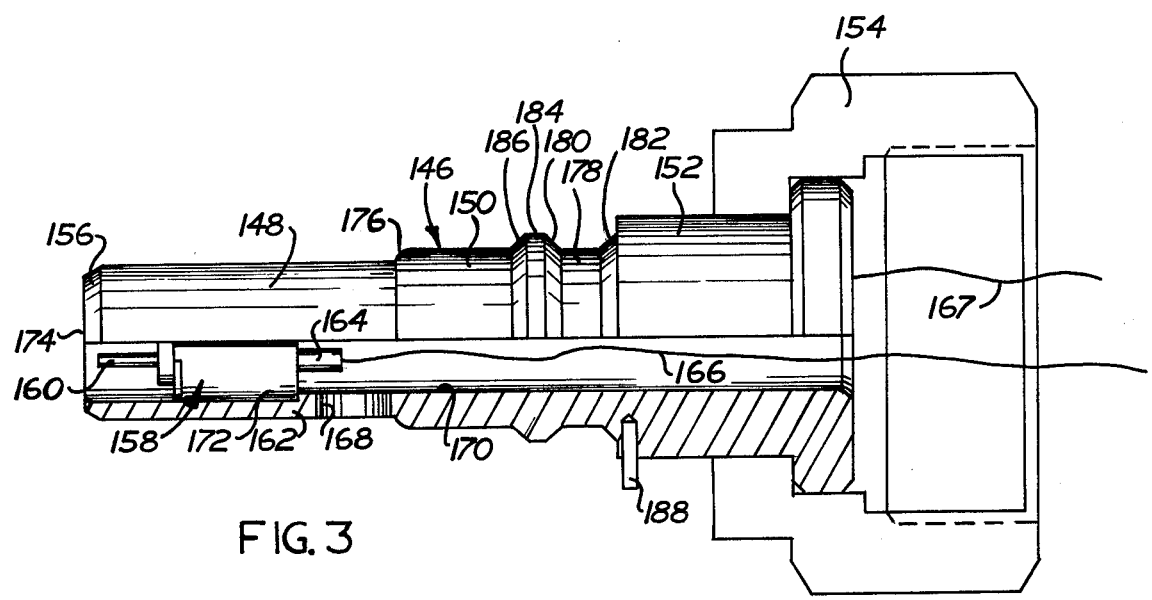
FIG. 3 shows an elevation in partial cross section of a fluid plug of the present invention and including an electrical plug assembly.

The outer portion of the locking sleeve 18 is provided with a major internal diameter cylindrical surface 54 against which the locking balls 20 rest when the plug of FIG. 3, for example, is removed. The cylindrical surface 54 is joined to the minor diameter cylindrical surface 44 by a frustoconical surface 56 which serves as a camming surface to urge the locking balls 20 radially inwardly into locking engagement with the plug 146 such as shown in FIG. 2 and as hereinafter more particularly described. A radially extending annular shoulder surface 58 formed in the locking sleeve 18 provides a seat for one end of the coil spring 60 which urges the locking sleeve 18 in a direction toward the right hand free end 33 of the socket as shown in FIG. 1. The radial extent of the annular surface 58 is sufficient to accommodate also the skirt portion 70 of the manually operable valve sleeve 24 for telescoping movement relative thereto. The internal diameter cylindrical surface 62 of the sleeve 18 is dimensioned for sliding or telescoping movement with respect to the external cylindrical surface 64 of the leading end or skirt portion 70 of the valve sleeve 24.

The valve sleeve 24 is provided with a minor internal diameter cylindrical surface 66 which is dimensioned for sliding telescopic movement with respect to the external cylindrical surface 68 of the internally threaded socket body member 14.

As indicated above, and beginning at the downstream extremity of the valve sleeve 24 (assuming gas flow from left to right as shown in FIG. 1) the valve sleeve 24 is provided with a skirt portion 70 which is slidably and telescopically received within the overlying skirt portion 72 of the locking sleeve 18 and circumvallated thereby. The skirt portion 70 in turn partially axially circumvallates the spring 60, and terminates in an annular shoulder 74 against which the spring 60 is seated for biasing the locking sleeve 18 in a direction away from the sleeve 24.

The valve sleeve 24 is provided with an internal circumferential recess or groove 76 for retention of an annular sealing member 78 which is conveniently an O-ring, preferably of oil resistant material such as neoprene. In the disconnected condition illustrated in FIG. 1, the sealing ring 78 is disposed in sealing engagement with the outer circumference 68 of the socket body member 14 and in axial alignment with the wall member 16. This disposition of the seal 78 between the circumferential array of radial ports 28 on the high pressure side of the wall 16 and the circumferential array of the radial ports 30 which are on the low pressure side of the wall 16, effectively prevents passage of pressurized fluid past the wall 16.

Still proceeding to the left in FIG. 1, in respect of the valve sleeve 24, there is next provided an annular internal recess 80. The circumferential recess 80 is in effect a manifold for receiving high pressure gas from the circumferential radial ports 28 and conducting it around the end of wall 16 and to the circumferential array of radial ports 30 when the valve sleeve 24 is moved to the right. The axial dimension of the recess 80 is sufficient to bridge the respective circumferential arrays of ports 28 and 30 and the intermediate wall 16. Thus, by manually axially moving the valve sleeve 24 between the position shown in FIG. 1 and the position shown in FIG. 2, the flow of fluid or pressurized gas through the conduit 13 may be controlled.

On the upstream side of the circumferential recess 80 in the sleeve valve 24, there is provided a second circumferential groove 82 for receiving and retaining a sealing member 84 for sealing coaction with the outer surface 68 of the socket body portion 14. This seal 84 prevents escape of pressurized fluid from the upstream side of valve sleeve 24 when the valve sleeve 24 is in either position.

The valve sleeve 24 is provided with a relatively short and narrow axially extending slot 86 terminating at a stop surface 88 which provides clearance for a ball 90 staked in a recess 92 in the outer surface 94 of the socket body portion 14. The sleeve wall outside of recess 80 contacts an external shoulder 91 to prevent further movement of the valve sleeve 24 in an axial direction to the left. The slot which serves as an elongated guide permits movement in an axial direction to the right as shown in FIG. 1 to allow the valve to be open for the passage of fluid from the conduit 11 through the mouth 13 into the chamber 15 and around the wall 15 as previously indicated. Right-hand movement of the valve sleeve 24 is limited when the socket is in the open condition by the leading edge 96 coming into abutment with the circumferential annular surface 58 in the locking sleeve 18 or by fully compressing the spring 60. The combination of the ball retaining sleeve 22 which is spring held in its position as shown in FIG. 1 by the coil spring 32, and coacting through the locking ball 20 with the frustoconical surface 56 of the locking sleeve 18 blocks axial movement of the locking sleeve 18. This makes impossible inadvertent opening of the pressurized gas passage from the chamber 15. Thus, in the disconnected condition as shown in FIG. 1, the valve sleeve 24 cannot be moved to a position which will permit pressurized fluid to escape.

Turning now to the components supported within the socket 10 and again reviewing FIG. 1 from right to left, there is first encountered the ball retainer 22. The ball retainer 22 is an annular sleeve having an external cylindrical surface 98 dimensioned for sliding contact with the internal surface 36 of the socket body 14. The sleeve 22 is also a stabilizing sleeve for the fluid plug 146 as hereinafter discussed. The outer surface 98 of the sleeve 22 is also provided with an annular groove 100 in which is disposed a sealing element 102, for example, a neoprene O-ring. The inner radial surface 104 of the ball retainer 22 is in abutting relation with the coil spring 32 which coacts between the surface 104 and the annular shoulder 34 formed in the socket body 14 to urge the ball retainer 22 to the right as viewed in FIG. 1. The surface 98 also carries a reduced cylindrical surface 106 joined thereto by a frustoconical surface 108. The combined effect on the locking ball 20 of the frustoconical surface 56 of the sleeve 18 and 108 of retainer 22, both of which are urged to the right by the springs 60 and 32, respectively, is to urge the locking ball 20 axially to the right and against the surface of the hole 38 in the socket portion 14 which is flared radially outwardly. The combined effect of these surfaces and the spring bias acting on them is to cam the ball in such a manner that it is seated against frustoconical surface 56 of the locking sleeve 18 and prevented from radial inward movement by the cylindrical surface 106 of the ball retainer 22. Even limited axial movement of the locking sleeve 18 in an axial direction to the left as shown in FIG. 1 will not permit escape of the ball 20 in a radially outward direction because of the cylindrical recess diameter 54 of the locking sleeve 18. Such abutment stops movement of the sleeve 18 before the axial extent of cylindrical surface 54 clears the locking ball 20 sufficiently to allow it to escape.

As will be shown in connection with the discussion of FIG. 2, as the fluid plug 146 is inserted into the socket 10, it initially engages a frustoconical guide surface 110 of the ball retainer 22 to align the axis thereof with the axis of the socket 10. The internal cylindrical surface 112 of the ball retainer 22 is provided with a circumferential groove 114 in which is disposed an annular sealing member 116 such as a neoprene O-ring. The inner end of the ball retainer 22 is provided with a radially inwardly directed flange 118 against which a shoulder on the fluid plug 146 abuts as hereinafter described to cause axial movement of the ball retainer 22 to the left against the bias of the coil spring 32.

Figure 4:
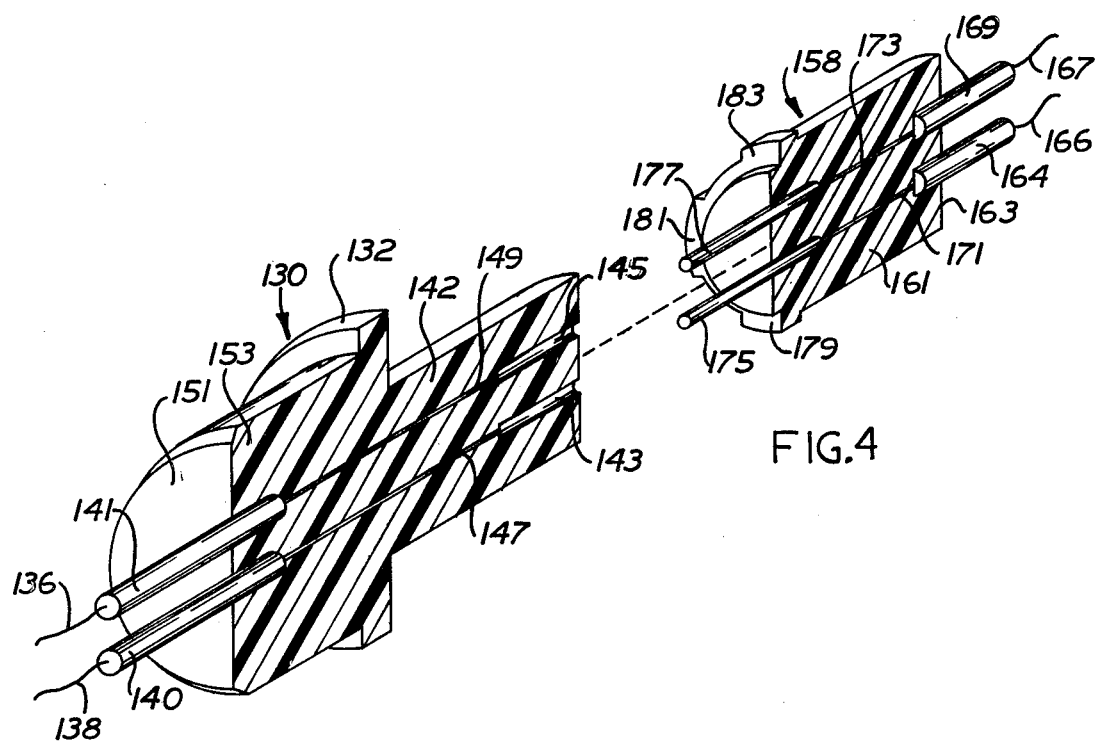
FIG. 4 is an isometric cross-sectional view on an enlarged scale of electrical socket plug assemblies in accordance with this invention in exploded relation.

The remaining structural element of the socket 10 shown in FIGS. 1 and 2 is the electrical socket assembly 26. In the preferred embodiment shown in FIGS. 1 and 2, the assembly 26 is supported by the wall 16. The assembly in the preferred embodiment includes a cup 120 frictionally and sealingly retained in a circular opening 122 in the wall 16. An annular flange 124 near the mouth of the cup and on the external surface thereof holds the cup 120 against axial movement toward the left. The mouth of the cup 120 is provided with a frustoconical surface 126 to aid in the proper telescoping of the leading end portion 148 of the fluid plug 146 shown in FIG. 3. The bottom of the cup is provided with a circular opening 128 which securely grips the outside of an electrically insulating electrical socket member 130 the details of which are shown in FIG. 4 and described below. An annular flange 132 surrounding the electrical socket member 130 abuts against the bottom 134 of the cup 120. The electrical socket 130 may be potted into the cup 120 with a known potting compound for effective retention and sealing against fluid leakage between the cup 120 and the socket 130. Electrical lead 138 extends from a terminal 140 in the bottom of the threaded portion of the electrical socket 130.

A nose portion 142 of the electrical socket 130 extends into the interior of the cup 120 and defines therewith an annular space 144 dimensioned to receive in a telescoping manner the leading end portion 148 of the plug 146. The forwardly projecting nose portion 142 contains electrical connector elements electrically connected with corresponding electrical connector portions carried by the fluid plug shown in FIG. 3, and as hereinafter more particularly described.

Referring now to FIG. 3, there is here shown in partial cross section a fluid plug member 146 which is adapted and dimensioned for coupling with the socket 10 shown in FIG. 1 and in the manner shown in FIG. 2. The plug 146 is of generally tubular construction, and proceeding from left to right as shown in FIG. 3, there is provided first a leading end portion 148 of minimum external diameter relative to the entire plug, an intermediate locking portion 150 of intermediate diameter, and an end portion 152 including means for effecting connection with a fluid conduit. The means employed for connecting the fluid plug to a fluid conduit form no part of the present invention and a union type connection 154, for example, may be used; or a connection where the fluid plug 146 is internally threaded and receives an externally threaded fitting attached to the fluid conduit may be used.

The leading end portion 148 is conveniently provided with a frustoconical tip 156 to facilitate insertion into the cup 120 (FIG. 1). Mounted and sealed as by potting within the leading end portion 148 is an electrical plug 158 formed of a nonconducting material and having at least one electrical conductor pin 160 projecting outwardly toward the free extremity of the fluid plug 146. It should be noted that the wall 162 of the leading end portion 148 circumvallates the plug 158 and the pin 160. Extending from the rear of the plug 158 there are conveniently provided terminals 164 and 169 (FIG. 4) to which electrical leads 166 and 167 may be attached.

One embodiment of an electrical plug 158 is shown in FIG. 4 and described below.

The wall 162 is provided with at least one port or opening 168 to permit gas flow into the interior bore 170. While one such port 168 is shown in FIG. 3, a circular array of such ports around the end portion 148 may be provided.

The inner surface of the leading end portion 148 is conveniently provided with a shoulder 172 against which the electrical plug 158 is conveniently seated to insure that the pin 160, for example, is located behind the leading extremity 174 of the fluid plug 146.

The leading end portion 148 having the smallest OD of the plug 146 is dimensioned to fit through the ball retainer sleeve 22 without interference.

The intermediate portion 150 of the fluid plug 146 has a slightly larger external diameter than the leading end portion 148, and accordingly presents a leading shoulder 176 which may be of any suitable configuration. The leading shoulder 176 is conveniently dimensioned and configured for easy entry through the frustoconical opening 110 of the ball retainer member 22, past the circumferential seal 116 and for abutment against the inwardly directed flange 118 of the ball retainer 22. As the fluid plug 146 moves into the socket 10, and engages the flange 118, continued axial movement of the fluid plug causes a corresponding axial movement of the locking ball retainer 22 against the bias of spring 32, and eventually effects release of the locking ball 20 for radial inward movement and locking engagement with the fluid plug 146.

The fit of the intermediate portion 150 internally of the ball retainer sleeve 22 is made snug by the internal sealing O-ring 116 being compressed slightly by the exterior surface of the portion 150. This support improves stability of the coupling to side thrust. Stability is also aided by seating of the shoulder 176 against the flange 118 of the ball retainer 22. Provision of principal support for the plug 146 against side thrust forces at this region of the socket subjects the electrical socket means 130 to much reduced forces and prevents damage to the electrical socket means.

The fluid plug 146 is provided in the intermediate section 150 with a locking ball receiving recess 178 bounded on its upstream side by a frustoconical shoulder 180 and on its downstream side by an oppositely sloped frustoconical shoulder 182. The frustoconical surface 180 forms one side of a radially projecting rim 184 bounded on its upstream side by another frustoconical surface 186 to form a locking rim or ridge on the barrel of the fluid plug 146.

The trailing end portion 152 has an external diameter which is readily accepted by the internal diameter of the socket portion 14 at its open extremity 33. The external diameter of the portion 152 and the internal diameter of the socket opening 33 may be arranged to provide further stability of the coupling to side thrust forces if desired.

There is also provided a locating pin 188 radially projecting from the trailing end portion 152 of the fluid plug 146 which is adapted to engage a guide pin slot 190 axially extending in the socket portion 14 (FIG. 1). The circumferential width of the locating pin slot need, of course, be no greater than sufficient to accommodate the pin 188. The purpose of the locating pin 188 is to assure proper alignment of the electrical conductor pin 160 with the electrical conductor contained within the socket member 142 (FIG. 1).

FIG. 2 shows the coupling of the invention with the plug 146 fully inserted in the socket 10. In this condition, the leading end portion 148 has been telescopically received in the cup 120 and circumvallates the electrical socket 142. The electrical plug 158 is in abutting and electrically connected relationship with the electrical socket 142. The electrical leads 136 and 138 are now in electrical contact with the electrical leads 166 and 167. The fluid plug 146 is lockingly engaged within the socket 10 by means of the locking balls 20 having been radially inwardly directed and seated in the groove 178 also providing another point of support for the plug 146 to stabilize it against side thrust forces. The ball retainer sleeve 22 has been axially moved to the left as shown in FIG. 2 against the bias of spring 32 so that radial inward movement of the locking ball 20 can occur. Such radial inward movement of the locking ball 20 is accomplished by axial movement of the locking sleeve 18 in an outward direction (to the right in FIG. 1) to the position shown in FIG. 2 where the frustoconical shoulder 56 abuts the radially projecting snap ring 40 whereby further axial movement of the sleeve is prevented. The locking ball 20 has been cammed upwardly from the cylindrical surface 54 to the smaller diameter cylindrical surface 44 by the frustoconical ramp 56. This movement is aided by the coil spring 60. Thus, the plug 146 has been lockingly connected with the socket 10, and electrical connection established between the plug 158 and the electrical socket 142. The axially spaced plug support regions provided first by the ball retaining sleeve 22 and second by the locking balls 20 coacting in the plug groove 178 and optionally the fit between the ID of opening 33 and the OD of portion 152 of the fluid plug 146, eliminate for all practical purposes movement of the leading end portion 150 in response to aids thrust which might otherwise damage the electrical plug and socket portions 158 and 142, respectively.

As indicated above, the flow of pressurized gas with or without entrained oil is established by axial movement of the valve sleeve 24 to the right from the position as shown in FIG. 1. Because of the construction of the locking sleeve 18 and the telescoping relation of its skirt 72 with the leading end portion 70 of valve sleeve 24, movement of the valve sleeve 24 may be made independently of the locking sleeve 18 when in the plug locking position. Thus, fluid flow may be controlled by the valve sleeve 24 when the plug 146 is in the connected condition with the socket 10. In the valve open condition shown in FIG. 2, the axially elongated recess 80 of the valve sleeve 24 bridges the radial ports 28 and 30 and permits the flow of pressurized fluid from the internal fluid chamber 15 through the side wall of the socket portion 14 at the port 28 and around the end of wall 16, back through the socket portion 14 through port 30 and again into the chamber 15. Fluid then flows through the opening 168 in the side wall of the fluid plug 146 and into the internal bore 170 thereof which is in fluid communication with the second conduit 192 and to which the fluid plug 146 is coupled by an suitable means. The arrows in FIG. 2 illustrate a path followed by pressurized gas flowing through the coupling of the present invention.

The valve sleeve 24 should be rotated so slot 86 does not line up with ball 90. Thus sleeve 24 is prevented from being inadvertently shifted to the off position by the force of spring 60.

Flow of fluid through the coupling may be cut off while the plug 146 is locked in socket 10 by rotation of the valve sleeve 24 to line up slot 86 with ball 90 and reverse axial movement of the valve sleeve 24 whereby communication between the ports 28 and 30 is interrupted by the seal 78 when the valve sleeve 24 is returned to the position shown in FIG. 1. When the plug 146 is disconnected as shown in FIG. 1, the valve sleeve 24 cannot be shifted axially a distance sufficient to connect the ports 28 and 30 because the end 96 of the valve sleeve 24 will abut the radial shoulder 58 of the locking sleeve 18, or the raised knurled ridge 79 will interfere with the free end of the skirt 72 of the locking sleeve 18.

FIG. 4 shows in isometric cross section on an enlarged scale an electrical socket member 130 and a plug member 158. This structure is conveniently formed of a suitable nonconductor material, e.g. a settable or curable resinous material, or hard rubber material, known in the art for electrical coupling components. In the embodiment shown, the electrical socket member 130 is provided with a nose portion 142 which is dimensioned externally for telescopic reception in the leading end portion 148 of the fluid plug 146. The nose portion 142 has embedded therein metallic connectors 143 and 145 which are in turn connected by any suitable embedded conductor elements 147 and 149 to terminals 140 and 141 extending from the base 151 and to which electric wire leads 136 and 138 are suitably secured, for example as by solder. The nose portion 142 terminates at its inward end in a radially extending flange 132 which, as indicated above abuts, preferably sealingly, with the inner bottom of the cup 120. A rubber washer, not shown, may optionally be used for a seal between the cup 120 and the flange 132.

The portion 153 extending through the cup 120 is desirably potted into cup 140 with a suitable potting compound to provide a gas tight seal.

The electrical plug member 158 is provided with a cylindrical body 161 formed of a nonconductor material as is the socket member 130. The trailing end 163 has embedded therein and projecting therefrom metallic terminals 164 and 169 to which are attached the electric wire leads 166 and 167. The terminals 164 and 169 are connected internally by any suitable conductor elements 171 and 173, respectively, to partially embedded projecting metallic pins 175 and 177. The pins 175 and 177 are dimensioned and located for disposition within the metallic connectors 143 and 145 in the socket 130.

The outer surface of the electrical plug 158 is on a diameter readily received within the leading end portion 148 of the plug 146 and larger than the inner diameter of the bore 170 of the fluid plug 146 to the right of the shoulder 172 as shown in FIG. 3. Thus the end 163 of electric plug 158 abuts and is retained against the shoulder 172. At circumferentially spaced intervals about the opposite end of the electrical plug 158 is a plurality of radially projecting spacers 179, 181 and 183 (the fourth not appearing in the section) which may frictionally engage the inner surface of the leading end portion 148 and hold the electrical plug 158 recessed in the fluid plug 146. The plug and socket portions of FIG. 4 are potted into the end of the plug of FIG. 3 and the cup 120, respectively, to provide a gas tight connection.

In summary, therefore, there has been provided a quick connect-disconnect coupling for simultaneously connecting and disconnecting two fluid conduits and the ends of electrical conductors. An electrical socket structure 130 is supported by a wall 16 extending across the socket 10. The electrical socket 130 is constructed and dimensioned for telescopic receipt of the leading end portion 148 of a fluid plug 146. The latter is lockingly engaged and held in the fluid socket 10. The wall 162 of the leading end portion 148 of the plug 146 completely surrounds and protects the electrical plug member 158 disposed therein and having an electrical contact 160 projecting therefrom. The outer extremity of the electrical contact 160 is disposed within the fluid plug 164 behind the plane of the extremity 174 and is, therefore, continuously protected from damage by rough handling either during the connection operation or in the disconnected condition. Likewise, the electrical socket 130 is provided with a socket portion 142 which encloses an electrical connector and protects it from damage. Fluid flow through the coupling is controlled by an axially movable sleeve 24 which establishes fluid communication between radial ports disposed on either side of the wall 16 through a recess in the valve sleeve dimensioned to span the openings 28 and 30 in the open condition and permit flow around the wall 16. In the closed condition, with the valve sleeve 24 fully retracted, communication is prevented between the ports 28 and 30 by means of a circumferential seal 78 coacting with the outer surface of the wall 16. The entire structure when connected is characterized by stability to side thrust forces and protection of the electrical socket and plug assemblies against damage in rough handling.

What is claimed is:

1. A quick connect-disconnect coupling for simultaneously connecting and disconnecting fluid conduits and the ends of an electrical conductor comprising a combination, a socket attached to one of said fluid conduits, a wall across said socket; a first electrical connector element supported by said wall; a fluid plug attached to the other of said fluid conduits, said plug having a second electrical connector element disposed within and circumvallated by the leading end portion thereof, said leading end portion being dimensioned to fit within said socket and for telescoping movement with respect to said first electrical connector element to establish electric connection, means for holding said plug in said socket and means for directing a flow of fluid around said wall and through said plug to connect said conduits in fluid communication with each other including a manually operable valve member selectively movable between an open condition and a closed condition when said plug and socket are in the connected condition, said valve member being effective to prevent fluid flow around said wall when said valve member is in the closed condition and block fluid flow between said conduits, said valve member being effective to allow fluid to flow around said wall when said valve is in the open condition and enable fluid flow between said conduits.

2. A quick connect-disconnect coupling for simultaneously connecting and disconnecting fluid conduits and the ends of an electrical conductor comprising in combination a fluid socket attached to one of said fluid conduits, a wall in said socket, electrical socket means including a pin contact receiving first electrical conductor element supported by said wall; a plug attached to the other of said fluid conduits, said plug having a second electrical connector disposed within and circumvallated by the leading end portion thereof, said electrical connector element having at least one outwardly projecting electrical pin contact which is telescopically received in said contact receiving conductor element in said electrical socket means when said coupling is in the connected condition, the axial extent of said leading end portion of said fluid plug being greater than the axial extent of said outwardly projecting electrical contact to protect said outwardly projecting electrical contact when said coupling is in the disconnected condition, and said electrical socket means being circumvallated by said leading end portion of said fluid plug when said coupling is in the connected condition; means for holding said fluid plug in said fluid socket, and means for by-passing fluid around said wall and through said fluid plug to connect said conduits in fluid communication with each other including a manually operable valve member selectively movable between an open condition and a closed condition when said plug and fluid socket are in the connected condition, said valve member being effective to prevent fluid flow around said wall when the valve member is in the closed condition and block fluid flow between said conduits, said valve member being effective to allow fluid to flow around said wall when said valve is in the open condition and enable fluid flow between said conduits.

3. A quick connect-disconnect coupling in accordance with claim 1 wherein said means for holding said fluid plug in said fluid socket include a circumferential groove about the body of said plug, an axially movable locking sleeve surrounding said fluid socket and a plurality of radially movable locking elements coacting through said socket and between said plug groove and said locking sleeve in response to axial movement of said locking sleeve between a locked position and a release position.

4. A quick connect-disconnect coupling in accordance with claim 3 wherein said radially movable locking elements are locking balls and said plug socket is provided with a circumferential array of locking ball holes dimensioned for movement of said balls therethrough.

5. A quick connect-disconnect coupling in accordance with claim 1 wherein said locking sleeve includes a pair of stepped cylindrical surfaces of different diameters for coaction with said locking elements in the locked position and in the release position, and a frustoconical ramp joining said stepped cylindrical surfaces.

6. A quick connect-disconnect coupling for simultaneously connecting and disconnecting fluid conduits and the ends of an electrical conductor comprising in combination, a socket attached to one of said fluid conduits, a wall across said socket; a first electrical connector element supported by said wall; a fluid plug attached to the other of said fluid conduits, said plug having a second electrical connector element disposed within and circumvallated by the leading end portion thereof, said leading end portion being dimensioned to fit within said socket and for telescoping movement with respect to said first electrical connector element to establish electric connection, said electrical connector element supported by said wall including a cup concentrically disposed and frictionally retained in said wall, and a circumferentially flanged nonconductor insert, said cup having an external diameter less than the diameter of said fluid socket and a circumferential flange for engagement with the upstream face of said wall, an opening through the bottom of said cup dimensioned for frictional retention of nonconductor insert with the circumferential flange internally disposed in said cup, said nonconductor insert including an upstream electrical socket portion extending in an upstream direction within said cup and defining therewith an annular recess for telescopic receipt of the leading end portion of said fluid plug, said electrical socket portion including an electrical connector element recessed therein; and said second electrical connector element includes a pin connector for receipt in said electrical socket portion and contact with said recessed electrical connector element, and electrical leads extending from said electrical connector elements, and means for holding said plug in said socket and means for directing a flow of fluid around said wall and through said plug to connect said conduits in fluid communication with each other including a manually operable valve member selectively movable between an open condition and a closed condition, said valve member being effective to prevent fluid flow around said wall when said valve member is in the closed condition and block fluid flow between said conduits, said valve member being effective to allow fluid to flow around said wall when said valve is in the open condition and enable fluid flow between said conduits.

7. A quick connect-disconnect coupling in accordance with claim 6 wherein the electrical connection between said first and second electrical conductor elements is located at said wall in said fluid socket.

8. A quick connect-disconnect coupling for simultaneously connecting and disconnecting a pair of fluid conduits and the ends of an electricl conductor comprising in combination, a socket attached to one of said fluid conduits and having an axial bore extending therethrough, a wall across said socket, a fluid plug attached to the other of said fluid conduits, said fluid plug including an intermediate portion of predetermined diameter and a shoulder to a lesser diameter, means for locking said fluid plug in said socket including a plurality of radially movable locking elements circumferentially disposed in said socket for movement radially toward said fluid plug for locking engagement therewith in a connected condition and for movement radially away from said fluid plug to a disconnected condition, means for radially moving said locking elements, locking element retaining sleeve means coacting internally of said socket and axially slidable therein between a locking member retaining position in the disconnected condition and a locking member releasing - fluid plug stabilizing position, means coacting between said socket and said retaining sleeve to normally urge said locking member retaining sleeve to said locking member retaining position; said locking element retaining sleeve being internally dimensioned for limited clearance telescopic movement relative to said fluid plug, said retaining sleeve including a radially inwardly extending flange located and dimensioned for abutment with the shoulder on said fluid plug, said sleeve being axially slidable in response to axial force transmitted thereto from said fluid plug through said shoulder to a connected position whereby said sleeve stabilizes said fluid plug to side thrust forces; said fluid socket and said fluid plug each including a recessed electrical connector element adapted to be electrically joined when said plug and said socket are connected.

9. A quick connect-disconnect coupling in accordance with claim 8 wherein said locking element retaining sleeve includes resilient sealing means for coaction between the inside of said sleeve and the outside of said fluid plug, and resilient sealing means for coaction between the outside of said sleeve and the inside of said socket.

10. A quick connect-disconnect coupling in accordance with claim 6 wherein said means for holding said fluid plug in said fluid socket include a circumferential groove about the body of said plug, an axially movable locking sleeve surrounding said fluid socket and a plurality of radially movable locking elements coacting through said socket and between said plug groove and said locking sleeve in response to axial movement of said locking sleeve between a locked position and a release position.

11. A quick connect-disconnect coupling in accordance with claim 10 wherein said radially movable locking elements are locking balls and said plug socket is provided with a circumferential array of locking ball holes dimensioned for movement of said balls therethrough.

12. A quick connect-disconnect coupling in accordance with claim 6 wherein said locking sleeve includes a pair of stepped cylindrical surfaces of different diameters for coaction with said locking elements in the locked position and in the release position, and a frustoconical ramp joining said stepped cylindrical surfaces.

13. A quick connect-disconnect coupling in accordance with claim 6 wherein the electrical connection between said first and second electrical conductor elements is locked at said wall in said fluid socket.

* * * * *

UNITED STATES PATENT AND TRADEMARK OFFICE
CERTIFICATE OF CORRECTION

PATENT NO. : 4,094,567
DATED : June 13, 1978
INVENTOR(S) : Thomas D. Karcher and Harry H. Hammond It is certified that error appears in the above-identified patent and that said Letters Patent are hereby corrected as shown below:

Column 10, line 31, change "a" to --in--.

Column 10, line 63, after "connector", insert thereat --element--.

Column 14, line 13, change "locked" to --located--.

Signed and Sealed this

Twenty-sixth Day of December 1978

[SEAL]

Attest:

RUTH C. MASON
Attesting Officer

DONALD W. BANNER
Commissioner of Patents and Trademarks